United States Patent [19]
Kennedy et al.

[11] Patent Number: 6,055,519
[45] Date of Patent: Apr. 25, 2000

[54] FRAMEWORK FOR NEGOTIATION AND TRACKING OF SALE OF GOODS

[75] Inventors: Brian M. Kennedy, Coppell; Christopher D. Burchett, Carrollton, both of Tex.

[73] Assignee: i2 Technologies, Inc., Dallas, Tex.

[21] Appl. No.: 08/947,544

[22] Filed: Oct. 11, 1997

[51] Int. Cl.[7] .................................................. G06F 15/00
[52] U.S. Cl. .............................................................. 705/80
[58] Field of Search ............................. 705/26, 4, 1, 6, 705/31, 34, 35, 37, 23, 80; 706/10

[56] References Cited

U.S. PATENT DOCUMENTS

| | | | |
|---|---|---|---|
| 5,504,837 | 4/1996 | Griffeth et al. | 706/10 |
| 5,508,913 | 4/1996 | Yamamoto et al. | 705/37 |
| 5,615,269 | 3/1997 | Micali | 705/7 |
| 5,734,837 | 3/1998 | Flores et al. | 705/7 |
| 5,794,207 | 8/1998 | Walker et al. | 705/23 |
| 5,884,041 | 3/1999 | Hurwitz | 370/231 |

FOREIGN PATENT DOCUMENTS

| | | | |
|---|---|---|---|
| 9704410 | 2/1997 | WIPO | G06F 17/60 |
| 9729443 | 8/1997 | WIPO | G06F 17/60 |

OTHER PUBLICATIONS

Carrie Beam, Arie Segev and J. George Shanthikumar, "Electronic Negotiation Through Internet–Based Auctions", Dec. 1996 (found at http://haas.berkeley.edu/~citm/wp–1019–summary.html).

*Primary Examiner*—Allen R. MacDonald
*Assistant Examiner*—Michele Crecca
*Attorney, Agent, or Firm*—Baker Botts L.L.P.

[57] ABSTRACT

A computer implemented system and process are provided for negotiation and tracking of sale of goods. In this system and process, a negotiation engine (16) operates to store data representing a current state (18) of a negotiation between a seller and buyer. The negotiation engine (16) stores the data within a framework for representing aspects of the negotiation between the seller and buyer. The framework includes a request object, a promise object and an acceptance object that can store a current description of a contract. The framework also includes a set of one or more delivery deals determined by the contract. Each delivery deal can have a delivery request object, a delivery promise object, and a delivery acceptance object that can store associated item deals and time periods for delivery of item deals. Each item deal can have an item request object, an item promise object and an item acceptance object that can store individual sales-order line-items. The negotiation engine (16) thereby allows a user to monitor the current state of the negotiation over a range of prices, a range of dates, ranges of quantities of a set of goods, and a range of configurations of the goods in the set.

20 Claims, 2 Drawing Sheets

FRAMEWORK FOR NEGOTIATION AND TRACKING OF SALE OF GOODS

TECHNICAL FIELD OF THE INVENTION

This invention relates in general to the fields of order fulfillment, order quoting, available-to-promise, contract negotiation, purchasing, supplier management, supply chain management, and single- and multi-enterprise planning. More particularly, the present invention relates to a computer implemented system and process providing a framework for negotiation and tracking of the sale of goods.

BACKGROUND OF THE INVENTION

Manufacturing, wholesale, retail and other entities often use a hybrid automated and manual negotiation process for the sales of goods. With respect to automating the buyer/seller negotiations, stock exchanges such as the NASDAQ have automated systems that conduct negotiation over prices of securities. Also, some organizations use electronic data interchange (EDI) in the sales process.

In particular, negotiation is needed in an environment where advanced orders for goods are taken and the goods are shipped after some combination of manufacturing, distribution, and transportation operations. Fundamentally, advanced orders are taken since the seller has limits on the ability to stock items to be sold to the buyer, such as: storage space; capital required to stock items at a level to where they do not run out; limits on the transportation available between factories, warehouses, and distribution centers feeding items to the point of sale; limits on suppliers of raw parts into the factories; and limits on machine or people constraints within the factories.

Advanced orders and negotiations are used in a number of environments. For example, suppliers of customers under the same corporate umbrella use the ordering and negotiation process to keep corporate inventories low (herein the terms "buyer" and "customer" may be used interchangeably as are the terms "seller" and "supplier"). The process is also used by assemble-to-order operations where the supplier does not know what to build until orders arrive, and by make-to-order operations where essentially the supplier has capacity and waits for a customer to ask the supplier to build something using that capacity. The negotiation between the seller and the buyer is then carried out manually often with misunderstandings as to the state of negotiations and about what agreements have been reached.

Electronic data interchange (EDI) is used as a direct, application-to-application transmission of business documents such as purchase orders, invoices, and shipping notices. EDI relies on the use of standards for the structure and interpretation of electronic business transactions. All trading partners must use a common standard regardless of the information technology (IT) infrastructure involved. In essence, EDI extracts information from applications and transmits computer-readable business documents via a Value Added Network (VAN) or simple telephone lines. At the receiving end, the data can be fed directly into the trading partner's computer system, where it can be automatically processed and interfaced with the receiver's internal applications. EDI is essentially a data format and transport mechanism. EDI does not contain any real intelligence to affect the sales process. Applications executed at each user's end perform any data manipulation or monitoring that might take place.

Electronic negotiation, which is different from EDI, comprises a field of research that has been described as "the process in which two or more parties multilaterally bargain goods or information for mutual intended gain." Beam, Carrie, Arie, Segev, and J. George Shanthikumar, "Electronic Negotiation Through Internet-based Auctions," CITM Working Paper 96-WP-1019. One sub-field of this study has been described in Beam, Carrie, Arie Segev, and J. George Shanthikumar, "Electronic Negotiation Through Internet-based Auctions," CITM Working Paper 96-WP-1019. This article describes agents that are programmed with rules and principles representing the interests of a particular business and carry out negotiation processes with a fellow software agent over "package" deals.

SUMMARY OF THE INVENTION

In accordance with the present invention, a computer implemented system and process providing a framework for negotiation and tracking of the sale of goods are disclosed that provide advantages over conventional electronic transaction mechanisms.

According to one aspect of the present invention, a computer implemented system and process provide for negotiation and tracking of the sale of goods. In this system and process, a negotiation engine operates to store data representing a current state of a negotiation between a seller and a buyer. The negotiation engine stores the data within a framework for representing aspects of the negotiation between the seller and a buyer. The framework includes a request object, a promise object and an acceptance object that can store a current description of a contract. The framework also includes a set of one or more delivery deals determined by the contract. Each delivery deal can have a delivery request object, a delivery promise object, and a delivery acceptance object that can store associated item deals and time periods for delivery of item deals. Each item deal can have an item request object, an item promise object and an item acceptance object that can store individual sales-order line-items. The negotiation engine thereby allows a user to monitor the current state of the negotiation over a range of prices, a range of dates, ranges of quantities of a set of goods, and a range of configurations of the goods in the set.

A technical advantage of the present invention is the provision of a framework for conducting and tracking of negotiations over all aspects of the product, including: prices, delivery dates, delivery quantities and configuration of items delivered. Further, the framework allows coordination of these multiple points of negotiation.

Another technical advantage of the present invention is that negotiation (requests, promises, and acceptances) is permitted over ranges of values instead of single values. For instance, a buyer can make a request for delivery within a range of dates of a range of quantities of an item.

Further, a technical advantage of the present invention is the ability for the buyer to specify rules that direct the seller on what to promise in the case that what the buyer is requesting cannot be satisfied (e.g., promise the earliest date on which you can promise the full quantity; promise as much as you can on the requested date; both; etc.). Furthermore, the buyer can specify rules on the coordination of multiple items in each delivery (e.g., if the seller cannot supply the full amount of all items, then reduce the quantity of all the items proportionally).

Another technical advantage of the present invention is the ability for the buyer and seller to agree on rules that direct the seller/supplier on what should be delivered if the agreement cannot be fulfilled (e.g., a machine goes down such that half of one item cannot be built; therefore deliver only half of all items in the delivery).

A technical advantage of the present invention is the ability to negotiate contracts (blanket orders) that have rules regarding a series of separate deliveries (e.g., the ability to request that you can have weekly deliveries of 5 to 50 units, up to 120 units per month).

A further technical advantage is that negotiation for a package of items is permitted rather simply for a single item. In contrast, a bidder on the NASDAQ, for example, can not request purchasing a package containing 100 shares of IBM and 100 shares of MICROSOFT for $20,000. The bidder must separate the request into two requests. The present invention handles such package requests, in part, because manufacturers often require them. For example, a manufacturer of a table wants to request 100 tabletops and 400 table legs and receive a quote for the whole package. A delivery policy field can allow a range of contracts and blanket orders to be modeled.

An additional technical advantage of the present invention is the specification of how to proceed when requests can not be met. In particular, a promising policy field can be used to express how the promise should be adjusted if the request cannot be met. Also, a fulfillment policy field can be used to express how the promise should be adjusted after acceptance if the plan cannot fulfill the promise.

Additional technical advantages should be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
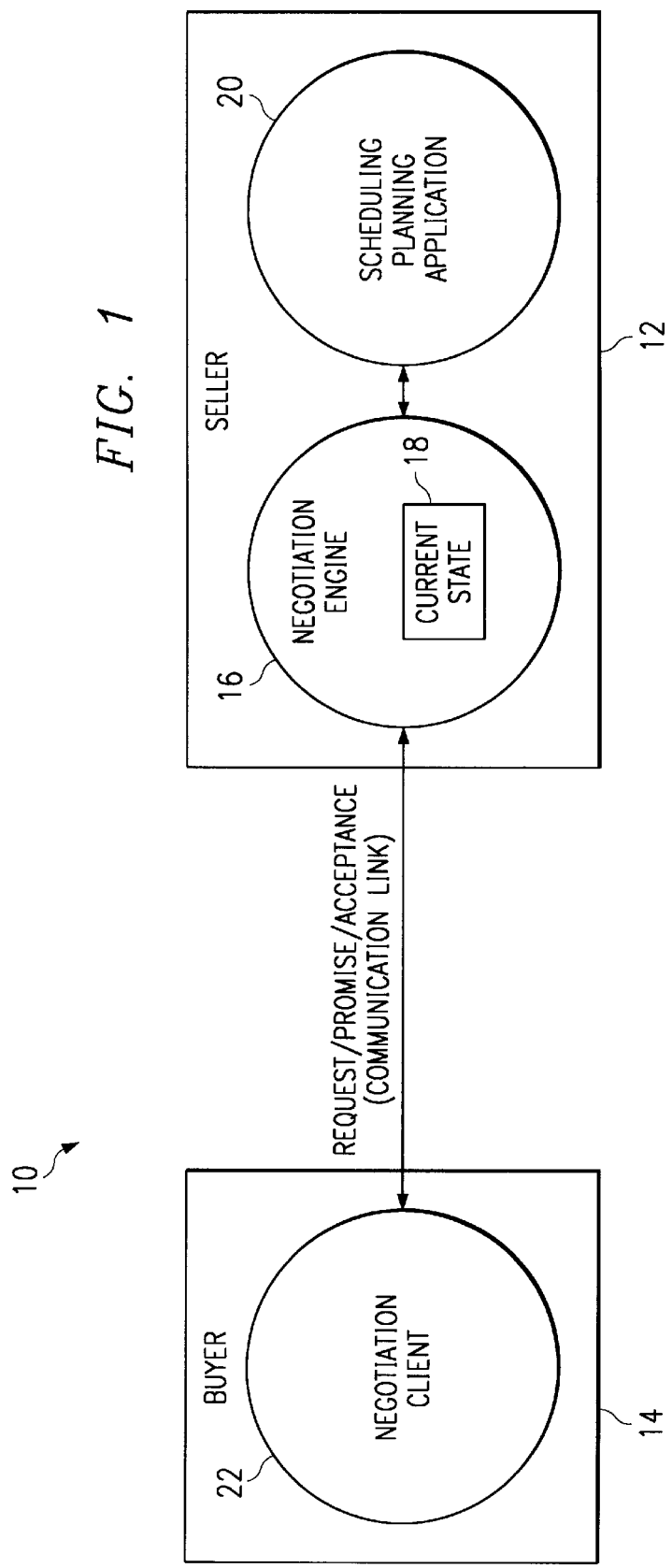
FIG. 1 is a block diagram of one embodiment of a computer implemented system providing a framework for negotiation and tracking of the sale of goods according to the present invention.

FIG. 1 is a block diagram of one embodiment of a computer implemented system, indicated generally at 10, providing a framework for negotiation and tracking of the sale of goods according to the present invention. System 10 provides a framework that improves the conventional negotiation process that occurs between sellers 12 and buyers 14 for the sale of goods by introducing computer implemented tracking and expression of requesting, promising, and accepting. This framework allows a more full and accurate exchange of information about what each side is willing to do or accept at each stage in the negotiation.

As shown, seller 12 has a negotiation engine 16 that stores a current state 18 of negotiations. Negotiation engine 16 can comprise a software application executed by a computer system and implements the request-promise-acceptance framework described in detail below. Current state 18 can comprise data stored in a storage device that represents the current state of negotiations as well as associated data such as relevant items, quantities and dates. Seller 12 also can have scheduling-planning software 20 that provides planning functions including determining what goods can be promised, based on capacity.

Buyer 14 can have a negotiation client 22 that communicates with negotiation engine 16 across a network communication layer. Negotiation client 22 can comprise a software application executed by a computer system and allows buyer 14 to query current state 18. Negotiation client 22 can be used to communicate requests and acceptances from buyer 14 to seller 12, and negotiation engine 16 can be used to communicate promises from seller 12 to buyer 14. The request, promise and acceptance information can also be communicated through other means such as by fax, phone, etc. According to the present invention, negotiation engine 16 provides a framework for maintaining current state 18 to reduce or eliminate any confusion about the status of the negotiation and relevant terms.

Figure 2:
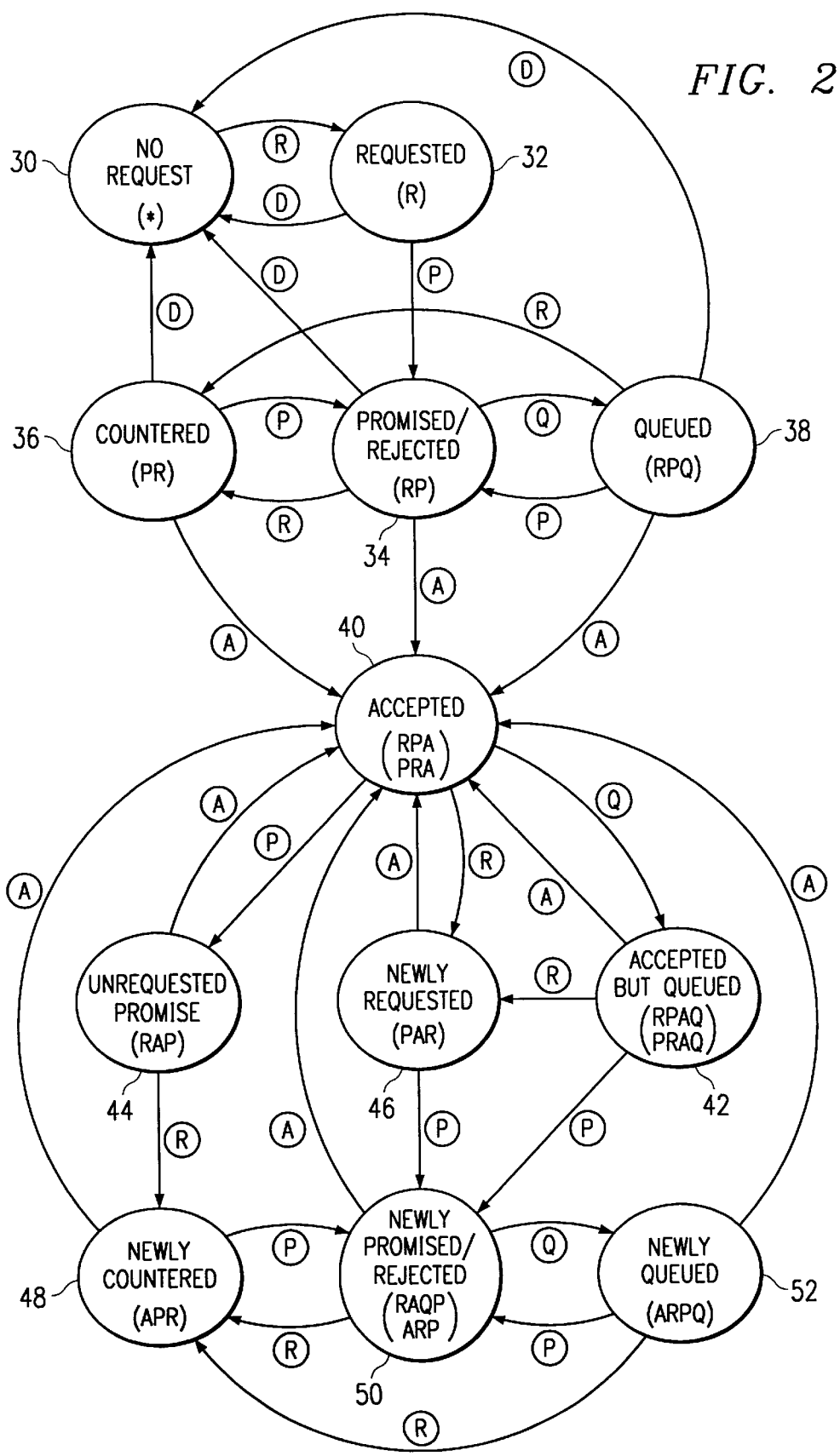
FIG. 2 is a diagram of one embodiment of states tracked within the framework for negotiation and tracking the sale of goods according to the present invention.

FIG. 2 is a diagram of one embodiment of states tracked within the framework for negotiation and tracking the sale of goods according to the present invention. The framework, which is described in detail below, provides a structure for representing the current state and relevant data (e.g., items, quantities, dates, etc.) which are stored to ensure both full communication and monitoring of sales negotiations.

In the embodiment of FIG. 2, the negotiation can move through twelve states. There are essentially five kinds of changes that can be made to cause state transitions: the buyer can issue a new request (R), the seller can offer a new promise (P), the buyer can queue a request (Q), the buyer can accept a promise (A), or the buyer can delete or withdraw a request (D). All five changes are not necessarily applicable to each state. In particular, the buyer can delete or withdraw a request until it is accepted, but once accepted, the request can no longer be withdrawn by the buyer.

As shown in FIG. 2, a state 30 represents that there is no request—either the negotiation has not been initiated by a request issued from the buyer or the request has been withdrawn and deleted. In state 30, if the buyer issues a request, the negotiation moves to state 32 in which a request has been issued. From state 32, the buyer can withdraw the request, returning the negotiation to state 30. Also from state 32, the seller can offer a promise, moving the negotiation to state 34. The seller may also reject the request by offering a promise to do nothing. From state 32, the buyer may also re-issue a new request, but the negotiation remains in state 32.

From state 34, the buyer can do one of four things. The buyer can delete or withdraw the request which moves the negotiation back to state 30. The buyer can issue a new request, moving the negotiation to state 36. The buyer can queue the existing request, moving the negotiation to state 38, and the buyer can accept the promise, moving the negotiation to state 40. From state 34, the seller may also re-offer a new promise, but the negotiation remains in state 34.

From state 36, the buyer can withdraw the request, returning the negotiation to state 30. From state 36, the seller can offer a promise, returning the negotiation to state 34. Also from state 36, the buyer can accept the existing promise, moving the negotiation to state 40. From state 36, the buyer may also re-issue a new request, but the negotiation remains in state 36.

From state 38, the seller can re-consider the request and offer a new promise, returning the negotiation to state 34. From state 38, the buyer can issue a new request, moving the negotiation to state 36. The buyer also can accept the existing promise, moving the negotiation to state 40. From state 38, the buyer may also re-queue the request, but the negotiation remains in state 38. Further, from any state where there is a promise, which includes all states except for 30 and 32, the buyer can accept the existing promise and move to state 40.

From state 40, the buyer can queue the existing request, moving the negotiation to state 42. The buyer can also issue a new request, moving the negotiation to state 46. From state 40, the seller can offer a new promise, moving the negotiation to state 44. From state 40, the buyer may also re-accept the promise, but the negotiation remains in state 40, and the change would be largely pointless.

From state 42, the buyer can re-accept the existing promise, returning the negotiation to state 40. The buyer also can issue a new request, moving the negotiation to state 46. From state 42, the seller can re-consider the queued request and offer a new promise, moving the negotiation to state 50. From state 42, the buyer may also re-queue the request, but the negotiation remains in state 42.

From state 44, the buyer can accept the new promise, returning the negotiation to state 40. The buyer also can issue a new request, moving the negotiation to state 48. From state 44, the seller may also re-offer a new promise, but the negotiation remains in state 44.

From state 46, the buyer can re-accept the existing promise, returning the negotiation to state 40. From state 46, the seller can offer a new promise, moving the negotiation to state 50. From state 46, the buyer may also re-issue a new request, but the negotiation remains in state 46.

From state 48, the buyer can accept the new promise, returning the negotiation to state 40. From state 48, the seller can offer a new promise, moving the negotiation to state 50. From state 48, the buyer may also re-issue a new request, but the negotiation remains in state 48.

From state 50, the buyer has three options. The buyer can accept the new promise, returning the negotiation to state 40. The buyer can queue the existing request, moving the negotiation to state 52. And, the buyer can issue a new request, moving the negotiation to state 48. From state 50, the seller may also re-offer a new promise, but the negotiation remains in state 50.

From state 52, the buyer can accept the new promise, returning the negotiation to state 40. The buyer also can issue a new request, moving the negotiation to state 48. From state 52, the seller can offer a new promise, returning the negotiation to state 50. From state 52, the buyer may also re-queue the request, but the negotiation remains in state 52.

In the present invention, the state that a negotiation is in can be determined, for example, from the relative values of four time stamps: the date that the most recent request was issued, the date that the most recent promise was offered, the date that the most recent acceptance was made, and the most recent date that the request was queued. If there is only a request issued date, then the negotiation can be identified as being in state 32. If there is no acceptance date, and the promise offered date is at or after the request issued and queued dates, then the negotiation can be identified as being in state 34. If there is no acceptance date, and the promise offered date is before the request issued date, then the negotiation can be identified as being in state 36. If there is no acceptance date, and the request queued date is at or after the promise offered date and the request issued date, then the negotiation can be identified as being in state 38. If there is an acceptance date and it is at or after the promise offered and request issued and queued dates, then the negotiation can be identified as being in state 40. If the acceptance date is at or after the promise offered and request issued dates, but before the request queued date, then the negotiation can be identified as being in state 42. If the promise offered date is after the accepted date and at or after the request issued and queued dates, then the negotiation can be identified as being in state 44. If the request issued date is after the acceptance date, which is at or after the promise offered date, then the negotiation can be identified as being in state 46. If the request issued date is after the promise offered date which is after the acceptance date, then the negotiation can be identified as being in state 48. If the promise offered date is after the acceptance date, and either the request issued date or the request queued date is also after the acceptance date, then the negotiation can be identified as being in state 50. If the request queued date is after the promise offered date which is after the request issued date which is after the acceptance date, then the negotiation can be identified as being in state 52.

According to the present invention, the negotiation process can thus be tracked between buyer and seller in constrained environments by providing a framework for progressing through the state diagram of FIG. 2 while also storing the current state of and relevant data for the negotiation.

In general, the present invention can be used in sales environments for the purpose of optimizing the profits of both the buyer and seller. Typically, The buyer will request some quantities of items to be delivered within a given period. The seller will use some decision process to figure out whether filling that request is possible or whether an alternate plan is possible (such as delivering fewer items or delivering several days late). This decision process is often complex and may be performed by a finite capacity planning system, a finite supply chain planning system, a finite scheduler, an ATP process, or other such planning method. The seller then proposes to the buyer a promise to ship items at a certain quantity and date. The buyer thinks about the promise and either reissues an altered request (perhaps with lower quantities instead of later delivery) to which the seller must generate a new promise, or the buyer accepts the promise (which completes the negotiation).

The present invention provides numerous advantages over conventional negotiation processes. First, the exact state of the negotiation is detailed in such a way that automated and semi-automated decision systems (such as planning systems, order fulfillment systems, purchasing systems, supply chain management systems, etc.) can work against the alternate state transitions, and deal with the changes in states over time. Further, the invention allows a much richer expression of what the buyer wants and what the seller is willing to do. That richer expression allows the automated and semi-automated decision systems the opportunity to suggest alternatives more appealing to the other party, thereby reducing the number of iterations through the states before an acceptance is reached. And even when the acceptance is reached, the acceptance itself is a richer expression of what is wanted, what ranges are acceptable, and what is preferable to do if the acceptance cannot be met. Finally, the invention not only allows a richer expression of a set of items to be delivered together, it also allows a richer expression of a set of separate deliveries which at a later date may be finalized within the accepted bounds.

As mentioned above, the state of the negotiation can be fully represented within the present framework. For example, a negotiation might be at the point where a request for goods has been made by the buyer, the seller has promised to deliver the goods two days later than requested, and the buyer has not yet responded to this promise. Another negotiation might be further along: the promise was days later than requested, and the buyer has responded with a counter request for more items on that date. An additional negotiation might be at another state where the buyer has accepted the seller's latest promise. Other states occur as an accepted negotiation is revised. For example, a seller might break his or her promise by issuing changes to his promise. (Although generally undesirable, breaking promises can be necessary at times because a manufacturing operation might break down or workers go on strike.) Depending on operational constraints, a buyer may be allowed to break his or her acceptance by issuing a changed request which prompts the seller to compute a new promise, which then signals the buyer to reject or accept.

The tracking of the state of the negotiation according to the present invention formalizes and monitors the negotiation for all concerned parties. This has several positive effects in the buyer-seller relationship. First, the process (e.g., software executing on a computer device) captures explicitly what has been communicated between the parties and what agreements have been made. Second, various other processes or software applications can use the state data in any number of ways. For instance, a scheduling system could prefer manufacturing items for which the seller has issued a promise to the buyer over those which have not yet been promised. This same system could prefer items that have a promise from the seller and an acceptance from the buyer (since such items are more likely to generate revenue).

The framework of the present invention also attaches dates to important communications within the negotiation. For instance, the system can record that the seller issued a promise to deliver requested items on May 14th and that the buyer accepted this plan on June 12th. Further, problems between the manufacturing plan and the current state of the negotiation can be pinpointed. For instance, if a request has been promised for delivery by the seller and the buyer has accepted whatever modifications were made by the seller, and the manufacturing plan expects to ship the items four days after the promised date, the present invention can allow the user to be notified of an "Accepted Plan Late" problem. A planner can then view such problems and can try to manipulate the overall plan so as to eliminate as many of them as possible.

Suppose a request has been promised for delivery but the buyer has not accepted the promise. Such a request is tentative and thus lower priority than an accepted request. The present invention can allow notification of the user of a "Promised Plan Late" problem. The user might give some attention to eliminating such a problem, but not at the expense of eliminating the Accepted Plan Late problem discussed previously.

According to the present invention, problems within the negotiation can be pinpointed. For instance, the buyer may have issued an acceptance that has a quantity or delivery date which does not match that promised by the seller. The users can immediately be notified of such "Delivery Acceptance Not Coordinated" problems. For example, consider the following request-promise-acceptance negotiation:

Buyer: "I'd like 10 of part A by Tuesday" (the request).
Seller: "You can have 10 of part A by Thursday" (the promise).
Buyer: "I agree to buy 10 of part A Wednesday (the acceptance, which is inconsistent with the promise).

The present invention also provides useful state information for focusing the attention of a human or automated planner. For instance, an automated planner would generally do a better job if it gives higher priority to plan resources for manufacturing accepted requests. Likewise, a human planner will often want to view the accepted requests and plan them first before planning the other (more tentative) requests.

The present invention can provide key state information for effective calculation of "Available To Promise" product (ATP). In general, ATP provides a system for calculating how many items are left open to promise to incoming requests and forecasted requests in a given time period. Effective ATP involves knowing which requests have been accepted and which have not. See U.S. patent applications Ser. No. 08/491,167, entitled "System and Method for Managing Available-to-promise (ATP) Product", and U.S. patent application Ser. No. 08/802,434, entitled "System and Method for Managing ATP". For example, ATP can use the following inputs: forecasted requests, actual requests (some Accepted, some not; some Planned, some not.) As forecasted requests and unaccepted actual requests change, ATP can be recalculated. ATP can then lock the quantities allocated to requests marked as accepted so that they are properly treated during this recalculation.

The present invention also can provide a supply chain planning system with a set of problem solvers for some of the problems described above. For instance, if an Accepted Plan Late problem exists in which items are planned to ship two days late, the present invention can invoke a problem solver to take an action such as moving the shipping operation's plan earlier and propagating resultant constraint violations to its upstream operations. A supply chain planning system can then be responsible for solving those constraint violations. See, e.g., U.S. patent application Ser. No. 08/491,168, entitled "Strategy Driven Planning System and Method of Operation." The present invention provides a basic model or framework that creates significant advantages for participants in a negotiation. The invention can apply to human or automated seller and buyer representatives, from different companies, from different branches or supply chains or factories or machine centers of the same company, etc. Herein, the term "site" is used in describing the factory, supply chain or activity of the buyer or seller. Also, for discussion purposes, the term "deal" is used to mean information common to a request, promise, and acceptance. A buyer's request proposes a "deal" to a seller. The seller's promise counter proposes a "deal" to the buyer. The buyer's acceptance finalizes the "deal." Within this framework, the deal mechanism of the present invention provides a rich and flexible computer-implemented purchase agreement.

In essence, a deal stores a purchasing relationship between a buyer and seller. For example, a deal might be a one-time purchase of one item, a one-time purchase of several items to be delivered at the same time or different times, or an ongoing contract (or "blanket order") of a series of future item purchases. A request "deal" is a proposal from the buyer for one of these relationships. A promise "deal" is the seller's counterproposal. An acceptance "deal" is the buyer's acceptance of the promise.

According to the present invention, a deal's data can be structured in three tiers. Deals themselves store an object oriented description of the contract. The simplest contract is a "one time purchase". Deals also contain a set of one or more "delivery deals" determined by the contract. A "delivery deal" stores a set of "item deals" and the period of time the items of the item deal must reach the buyer. An "item deal" stores the data of an individual sales-order line-item such as the item (or part) number, configuration instructions, quantity, and plan to manufacture and ship. It should be understood that other data can also be included.

According to the present invention, the three states of negotiation are stored using the deal mechanism. Thus, one deal stores a request, another deal stores the corresponding promise, and a third deal stores the corresponding acceptance. The delivery deals of requests, promises, and acceptances are called delivery requests, delivery promises, and delivery acceptances, correspondingly. Similarly, the item deals of delivery requests, delivery promises, and delivery acceptances are called item requests, item promises, and item acceptances, correspondingly. The following table depicts the parallel deal structure across request, promise, and acceptance:

| TYPE OF STRUCTURE | BUYER REQUEST | SELLER RESPONSE | BUYER CONFIRMATION |
|---|---|---|---|
| Deal | Request | Promise | Acceptance |
| Delivery Deal | Delivery Request | Delivery Promise | Delivery Acceptance |
| Item Deal | Item Request | Item Promise | Item Acceptance |

For example, the buyer issues a Request for a one-time purchase of 10 part100 and 20 part200 to be delivered some time between May 1 and May 5 and for 10 of part300 to be delivered between May 6 and May 7. The Request stores two Delivery Requests, one for May 1–May 5 and another for May 6–May 7. The first Delivery Request has two Item Requests, one for 10 part100 and another for 20 part200. The second Delivery Request has one Item Request for 10 part300. This describes the requested deal.

The seller considers this order and may come back with a Promise which has Delivery Promises and their Item Promises exactly matching the buyer's requested deal. Alternatively, the seller might differ in one or more quantities or parts. If the buyer had a special configuration requested for part300 it might differ in the promised configuration. It might differ in the range of delivery dates. The buyer would consider the promise and issue an acceptance which again could differ from the promise in any of these data.

The three types of deals are stored separately so that such differences can be detected, reported, and the details of the difference can be presented to the user or automated planner for resolution. In contrast, an alternate scheme could have stored one deal and kept a tag that described which state (request, promise, accept) it represented and a flag describing whether disagreement existed between current and previous state. But the user would not see that, for instance, the requested due date was five days before the promised due date. The user would only see that the promised due date is Tuesday and that some aspect of the request was not fulfilled by the promise.

The Request, Delivery Request, and Item Request structures together model and provide a framework for requests from one site to another. The Promise, Delivery Promise, and Item Promise structures together model and provide a framework for the supplying (promising) site's commitment back to the requesting site. These structures together implement what is traditionally called "Order Management" or "Demand Management." Simplified variations of those structures are often called "orders." The Acceptance, Delivery Acceptance and Item Acceptance structures together model and provide a framework for the forming of an agreement between the two sides. The following provides more description on each of the types of deals and framework structures according to the present invention.

For Requests, "delivery requests" define the delivery requests for the associated request. "Delivery policy" defines what 'delivery requests' will be created, and what should be created. A default policy, FIXED, can specify that there is no order variation—the 'delivery requests' explicitly list what is being requested. If all the 'delivery requests' have corresponding active delivery promises, then (and only then) is this Request 'promised'. "Accept by" defines the Date by which the customer intends to accept or reject any Promise that is made. This is the Date on which both parties would become committed. Note that this is just the requested 'accept by' Date—the actual deadline for accepting a Promise is in the Promise 'accept by'. The supplier considers this requested Date when making the Promise, but may choose a different Date based upon the delivery lead times of its Products. Such differences are part of the negotiation of Request and Promise. "Date issued" is the Date that this Request is considered to have been made. If this Date is after the Dates in the 'promise', then this Request is considered to be unanswered. Thus, setting this field to 'now' essentially renews this Request. "Date issued" can be updated to 'now' whenever the request is modified. "Date accepted" is the Date that the Promise offered for this Request was accepted (agreed to), assuming it has. Until accepted, the 'supplier' need not fill the Promise, and the customer need not accept it. Once offered, it must be accepted prior to the 'accept by' Date in the Promise (the 'accept by' Date in the Request is just a request). The Promise has only been accepted when 'date accepted' is on or after the promise's 'date offered', which itself must be on or after 'date issued'. The "Date queued" is the Date that the customer asked the supplier to queue this Request, if ever. If set, this date must be set to after the promise's 'date offered'. A queued Request is one that will be reconsidered if conditions at the supplier change such that new Requests can be satisfied. When that occurs, the supplier will immediately consider any queued Requests. In that way, the customer need not keep renewing a rejected Request in the hope that capacity has freed up. The flag "changeable" can be a flag (defaulting to true) which says whether any data of the other fields can be changed. If false, attempts to change other data fail and generate a warning. This flag operates over delivery request and item request data as well as the request data. This lock also can cut off the ability to renegotiate.

For Promises, the "delivery promises" are the delivery promises for the associated Promise. "Delivery policy" defines how 'delivery promises' may be adjusted, without "changing" the promise. This is typically the same as that of the corresponding request. "Accept by" means that once offered, this Promise is just an offer until accepted by the 'customer'. The offer is good until this 'accept by' Date. The 'customer' must accept this Promise by this Date or the Promise will expire. "Date offered" is the Date that the supplier promised delivery to the customer. The flag "changeable" can be a flag (defaulting to true) which says whether any data of the other fields can be changed. If false, attempts to change other data fail and generate a warning. This flag operates over delivery promise and item promise data as well as the promise data. This lock can cut off the ability to renegotiate.

For an Acceptance, the "delivery acceptances" are the delivery acceptances for the associated promise. "Accepted" is the Date that the requester accepted the promise (if ever).

For a Delivery Request, "item requests" are the individual order-line-items (Items) being requested. "Due" is the Date Range within which the delivery should be made to the customer. Sometime between 'due.start' and 'due.end', the full Quantity specified in each of the 'item requests' should be satisfied. "Max price" is the maximum price desired by the 'customer plan' for this Delivery Request. This is used as a guideline (not hard constraint) in order quoting. "Rate start" means that if this Date is within the 'due' Date Range, then the customer is requesting to be supplied incrementally at (or greater than) a linear rate. The linear rate is defined as the Quantity over the Time between the 'rate start' and the 'due.end'. The delivery is considered late if the cumulative rate at any Date between 'rate start' and 'due.end' is less than that linear rate. More mathematically, the amount supplied by Date 'd' should be greater than or equal to 'quantity*(d—rate_start)/(due.end—rate_start)'. Note that in either case, by 'due.end' the full quantity should be supplied.

"Promising policy" specifies the constraints on offering a Promise for the corresponding Request. The following describes the available promising policies:

ON TIME: if an ON TIME promise policy Delivery Request cannot be satisfied, then the promise should only be made for the amount/price that can be delivered on the date requested (it will be promised short). The Delivery Request should not be promised late.

ALL: if an ALL promising policy Delivery Request cannot be satisfied, then the promise should only be made for the entire amount/price (it will be promised late). The Delivery Request should not be promised short.

ALL ON TIME: if an ALL ON TIME promising policy Delivery Request cannot be satisfied for the entire amount/price on the date requested, then it should not be promised. The Delivery Request should not be promised short or late.

ASAP: if an ASAP promising policy Delivery Request cannot be satisfied, then it should be promised so as to deliver as much of the request as possible as soon as possible. This may split the request into a number of deliveries.

ASAP MONTHLY: If an ASAP MONTHLY promising policy Delivery Request cannot be satisfied, then it should be promised so as to deliver as much of the request as possible on the date requested and the rest will split into monthly deliveries. The monthly deliveries will be as late in the month as required to obtain the maximum amount of the available to promise for that month, but no later.

If a BUCKETED ALLOCATION promising policy Delivery Request cannot be satisfied on the date requested, then it should be promised as to deliver as much of the request as possible on the date requested. The remaining promises will split into bucketed deliveries where the buckets correspond to the forecast horizon. The EARLY bucketed deliveries will each be as late in the bucket as required to obtain the maximum amount of product available in that bucket.

For promises in LATE buckets (as well as late promises in the requested bucket), the deliveries will be according to ASAP. That is, there will be one delivery for each date where there is additional quantity available for at least one item request. Preference is given to ON TIME promises first, EARLY promises next, and finally LATE promises.

"Fulfillment policy" specifies restrictions on how a delivery is fulfilled. The following describes the available fulfillment policies:

ON TIME: if any item in an ON TIME Delivery Request can not be delivered on time, then the delivery will be shorted. That is, a partial delivery will be made rather than waiting until a full delivery can be made.

FULL QUANTITIES OF ALL ITEMS: if any item in a FULL QUANTITIES OF ALL ITEMS Delivery Request is unavailable on the delivery date, then the whole delivery will be delayed rather than making a partial delivery.

UNRESTRICTED: an UNRESTRICTED Delivery Request can be shorted, delayed, or both.

"Rank" is the customer-specified rank, weighting, importance of this Delivery Request relative to all other Delivery Requests from this customer.

For a Delivery Promise, "item promises" are promises for the individual order-line-items. "Due" is the Date Range within which the delivery is promised to be made to the 'customer'. Sometime between 'due.start' and 'due.end', the full Quantity specified in each of the 'item promises' should be satisfied. "Delivery price" is the price being quoted for the full delivery as specified. "Rate start" means that if this Date is within the 'due' Date Range, then the supply is promised to be delivered incrementally at (or greater than) a linear rate. The linear rate is defined as the Quantity over the Time between the 'rate start' and the 'due.end'. The delivery is considered late if the cumulative rate at any Date between 'rate start' and 'due.end' is less than that linear rate. More mathematically, the amount supplied by Date 'd' should be greater than or equal to 'quantity*(d—rate start)/(due.end—rate start)'. Note that in either case, by 'due.end' the full quantity should be supplied. "Fulfillment policy" defines whether a delivery can be shorted or delayed. Typically this is the same as 'delivery request.fulfillment policy'. However, if the supplier is not willing to do the requested fulfillment policy, the promised one will be different.

For Delivery Acceptance, the "item acceptances" are acceptances for the individual order-line-items. "Due" is the Date Range within which the promise is accepted by the customer. This can be the same as 'delivery promise.due'. However, if the supplier reopens negotiations by changing the 'delivery promise.due', then the values will differ. "Rate start" is the promise's rate start at which the promise is accepted by the customer. Typically this can be the same as 'delivery promise.rate start'. However, if the supplier reopens negotiations by changing the 'delivery promise.rate start', then the values will differ. "Fulfillment policy" is the accepted policy defining whether a delivery can be shorted or delayed. Typically this can be the same as 'delivery promise.fulfillment policy'. However, if the supplier reopens negotiations by changing the 'delivery promise.fulfillment policy', then values will differ.

For Item Request, the "configuration" is the Item being requested and the specific characteristics desired. The Item may be a STANDARD Item (no characteristics to specify), a Request-specific configuration of a OPTIONED Item, or a Request-specific CUSTOM Item (among others). "Quantity" is the range of Quantity of the 'configuration' that is being requested as part of the 'owner' Delivery Request. Often this is a zero-interval range—a particular Quantity is being requested. But in some industries, particularly where the yield varies or the Items are specialized, giving a range from the minimum you need to the maximum that you will accept can prevent unnecessary waste, making the supply chain more economical. "Max price" is the maximum price desired by the 'customer' for this Item Request. This is used as a guideline (not hard limit) in order quoting. "Delivery plan" is the Operation (if any) that has been planned to deliver this Item Request. This operation specifies any upstream operations necessary to feed it parts; thus, 'delivery plan' represents the entire activity to ship this Item Request. The 'delivery plan' can be set by the human or automated planner to satisfy either the Item Request or its corresponding Item Promise or Item Acceptance. The distinction shows in the types of problems that are identified as discussed below. For instance, if a delivery plan is set for the Item Promise and is four units short of that item promise's quantity, a "Promise Planned Short" problem can be identified rather than a "Request Planned Short" or "Acceptance Planned Short" problem. The human or automated planner is thus given a choice of three planning states; one for requests, one for promises, and one for acceptances. "Receiving plan" is the Operation that has been planned to receive this Item Request. This is the customer's scheduled operation of receiving the items delivered by 'delivery plan'.

For Item Promise, the "configuration" is the Item and specific characteristics promised. This is almost always the same as the corresponding item request's 'configuration' (unless the requested configuration is not available or feasible). "Quantity" is the range of Quantity of the 'configuration' that is being promised as part of the Delivery Promise. This is typically the corresponding item request's 'quantity'. However, if that Quantity was not feasible, then this Quantity may be less. "Price" is the price being quoted to deliver as specified.

For Item Acceptance, the "configuration" is the Item and the specific characteristics accepted for purchase. This is almost always the same as the corresponding item promise's 'configuration' unless the item promise's configuration has been changed due to unavailability of inventory or inability to manufacture. "Quantity is the range of Quantity of the 'configuration' that is being accepted as part of the Delivery Acceptance. This is typically the corresponding item request's 'quantity'. However, if that Quantity was not feasible, then this Quantity may be less.

Each of the "policy" data (e.g., delivery policy, promising policy, fulfillment policy) mentioned above can be implemented using an extensible architecture as described, for example, in U.S. patent application Ser. No. 08/491,153, entitled "Extensible Model Network Representation System for Process Planning". These data are object oriented descriptions of behavior. By creating a new subclass of the base object class, new behaviors can be plugged in.

The negotiation is a set of states and rules governing transitions between states, for example, as shown in FIG. 2. In general, when a request is issued by Buyer, then Seller: offers a promise (which may differ from the request), or rejects the request. If Seller offers a promise, then Buyer: accepts the promise, deletes the request, or reissues a modified request. If Seller rejects the request, then Buyer: deletes the request, queues the request for future consideration by Seller, or reissues the request, possibly modified. When a request is an actual order, only the customer should be modifying the request and only the suppliers should be modifying the promise. According to the present invention, deadlines can be imposed on the various responses. Thus, the buyer may require a promise by a certain dates, and a seller may require an acceptance by a certain date.

The negotiation protocol can be maintained by Date fields that keep track of when things happened. By comparing the Dates, the state of the protocol is known. The fields can be: 'date issued', 'promise.date offered', 'date queued', and 'date accepted'. The deadlines can be 'promise by' and 'promise.accept by' (note that the Request's 'accept by' is just the desired deadline). If 'date issued' is after 'promise.date offered', then the Request has not been responded to, and a "Promise Not Offered" problem will exist. If 'promise date offered' is at or after 'date issued' and 'date accepted' is before 'promise date offered', then the Request has been offered a Promise, but the Promise has not been accepted. A "Promise Not Accepted" problem will then exist. If 'date accepted' is at or after 'promise.date offered' which is at or after 'date issued', then the Promise has been offered and accepted and is now binding on both parties. If 'date queued' is at or after 'promise.date offered' which is at or after 'date issued', then the Request has been queued for later consideration and a "Request Queued" problem will exist.

In some implementations, the steps in the negotiation are initiated by human planners. They take into account order priorities outside of the invention, customer relationships not understood by the invention, and capacity factors calculated by their supply chain planning system. Automated software could also calculate these steps. The following discussion includes a description of what problems can be pinpointed by the present invention and how that can guide human or automated planners to choose the above steps. Each implementation of the present invention will also vary in when plans are generated (specifically, the 'delivery plan' and 'receiving plan' of each Item Request). Some implementations will wait for each negotiation to complete (for the Acceptance state to be reached). Some implementations will plan as soon as the Promise is made, knowing that their particular buyers usually accept any promise. Some implementations will plan after certain promises are made (e.g. for certain items or for certain request priorities or specific buyers) while waiting for acceptance on the rest. Some will plan requests, knowing that capacity is high and wanting to pinpoint potential problems at the earliest date. An automated planner might plan all accepted orders, then, as capacity allows, plan all promised unaccepted orders, then as capacity allows, plan all unpromised requests. The present invention handles the negotiation such that human or automated planners can get the information needed to implement such planning procedures.

The present invention manages the negotiation process and provides human and automated planners with information necessary to effectively plan and schedule the procuring, manufacturing, transportation, warehousing, and shipping operations necessary to deliver requested items. The basic information provided is the state of the negotiation for each order (e.g. whether the order is Requested, Promised, or Accepted).

Additional information can be provided which is termed "problems". An example problem is an order whose Promise does not match the Request. Another example is an order that is Promised but not Accepted (part of the "basic information" mentioned above). Another example is an order that is not yet promised and is planned but the planned delivery is later than requested. These pieces of information are critical for a human or automated planner to juggle capacities and modify plans in a way that optimizes performance of the supply chain.

The present invention allows requests, promises, and acceptances over ranges of delivery dates and quantities. Thus, a buyer may request delivery any time from Monday through Thursday and may accept anywhere from 20 to 30 units of the item. In detecting request and promise problems, one date range is compared with another for lateness or earliness conditions, and one quantity range is compared with another for excess or shortness conditions. A given range is a late or excess problem when its maximum value is greater than the maximum value of the other range. For instance, a promise 'due' field is late if the maximum date is greater than the requested 'due' field. Conversely, a given range is early or short when its minimum value is less than the minimum value of the other range.

The following describes types of problems that can be identified. It covers the meaning of each problem, the data used to identify the problem, and where possible the resolution methods by which a human or automated planner could try to eliminate or reduce the severity of the problem. (As an example of the latter, consider a "Lateness" problem. One resolution is to move the delivery plan earlier and slide any plans dependent on it earlier as necessary. If this action puts the delivery on schedule, the problem has been eliminated. If it succeeds in moving the delivery earlier but still behind schedule, the problem's severity has been reduced.)

A "Request Not Planned" problem indicates that the item request was issued after the item promise was offered—and—the 'delivery plan' has not been planned to satisfy the item request: either there is no 'delivery plan', or the 'delivery plan' is for the older item promise. This Problem will not occur if the delivery request has an infinite 'due' Date, the item request is for a zero 'quantity', or the item promise was offered after the item request was issued (or last modified). To resolve this Problem, either eliminate or zero out the item request (unlikely), 'offer' a Promise and switch the 'delivery plan' to satisfy the promise, or create and/or replan the 'delivery plan' to meet the item request.

The typical series of events begins with the receipt of a newly issued Request. Its Item Requests will each have this REQUEST NOT PLANNED Problem. The planner either uses ATP to Promise them directly (eliminating this problem, replacing it with "Promise Not Planned"), or the planner plans or replans 'delivery plan' (eliminating this problem, replacing it with "Promise Not Offered"). The "Request Queued" problem is a variation of this problem—both are resolved the same way, but a "Request Queued" Request has been considered before, whereas a "Request Not Planned" Request is new.

A "Request Planned Late" problem indicates that the 'delivery plan' has been planned to satisfy the item request but is in fact planned later than the delivery request's 'due' Dates. To resolve this Problem, either set the delivery request's 'due' field to be later (unlikely), or adjust the 'delivery plan' such that its end Date is within 'due'.

A "Request Planned Early" problem indicates that the 'delivery plan' has been planned to satisfy the delivery request' but is in fact planned earlier than the delivery request's 'due' Dates. To resolve this Problem, either set the delivery request's 'due' to be earlier (unlikely), or adjust the 'delivery plan' such that its end Date is within 'due'.

A "Request Planned Short" problem indicates that the 'delivery plan' has been planned to satisfy the item request but is in fact planned for less 'quantity' than requested. To resolve this Problem, either reduce item request's 'quantity' (unlikely), or increase the Quantity planned by item request's 'delivery plan' to be within the requested Quantity Range.

A "Request Planned Excess" problem indicates that the 'delivery plan' has been planned to satisfy the item request bug is in fact planned for more 'quantity' than requested. To resolve this Problem, either increase the item request's quantity' (unlikely), or reduce the Quantity planned by the item request's 'delivery plan' to be within the requested Quantity Range.

A "Promise Not Planned" problem indicates that the 'delivery plan' has not been planned to satisfy the item promise: either there is no 'delivery plan', or the 'delivery plan' is for the item request rather than the item promise. This problem will not occur if the delivery promise has an infinite 'due' Date or the item promise is for a zero 'quantity'. To resolve this Problem, either eliminate or zero out the 'item promise' (unlikely), or create or replan the 'delivery plan' to meet the 'item promise', or if the 'delivery plan' is for the 'item request', then promise according to the quantity, price, and delivery date of 'delivery plan'. (In our software that action is termed 'promise as planned'.)

A "Promise Planned Late" problem indicates that the 'delivery plan' has been planned to satisfy the item promise but is in fact planned later than the delivery promise's 'due' Dates. To resolve this Problem, either set the delivery promise's 'due' to be later (unlikely), or adjust the 'delivery plan' such that its end Date is within 'due'.

A "Promise Planned Early" problem indicates that the 'delivery plan' has been planned to satisfy the item promise but is in fact planned earlier than the delivery promise's 'due' Dates. To resolve this Problem, either set the delivery promise's 'due' to be earlier (unlikely), or adjust the 'delivery plan' such that its end Date is within 'due'.

A "Promise Planned Short" problem indicates that the 'delivery plan' has been planned to satisfy the item promise but is in fact planned for less 'quantity' than promised. To resolve this Problem, either reduce the item promise's 'quantity' (unlikely), or increase the Quantity planned by the item promise's 'delivery plan' to be within the promised Quantity Range.

A "Promise Planned Excess" problem indicates that the 'delivery plan' has been planned to satisfy the item promise but is in fact planned for more 'quantity' than promised. To resolve this Problem, either increase the item promise's 'quantity' (unlikely), or reduce the Quantity planned by the item promise's 'delivery plan' to be within the promised Quantity Range.

An "Acceptance Not Planned" problem indicates that the item acceptance was made after the item promise was offered—and—the 'delivery plan' has not been planned to satisfy the item acceptance: either there is no 'delivery plan', or the 'delivery plan' is for the older 'item promise'. This Problem will not occur if the delivery acceptance has an infinite 'due' Date, the item acceptance is for a zero 'quantity', or the item promise was offered after the item acceptance was issued (or modified). To resolve this Problem, either eliminate or zero out the item acceptance (unlikely), make a new Promise, or create or replan the 'delivery plan' to meet the item acceptance.

An "Acceptance Planned Late" problem indicates that the 'delivery plan' has been planned to satisfy the item acceptance but is in fact planned later than the delivery acceptance's 'due' Dates. To resolve this Problem, either set the delivery acceptance's 'due' to be later (unlikely), or adjust the 'delivery plan' such that its end Date is within 'due'.

An "Acceptance Planned Early" problem indicates that the 'delivery plan' has been planned to satisfy the delivery acceptance but is in fact planned earlier than the delivery acceptance's 'due' Dates. To resolve this Problem, either set the delivery acceptance's 'due' to be earlier (unlikely), or adjust the 'delivery plan' such that its end Date is within 'due'.

An "Acceptance Planned Short" problem indicates that the 'delivery plan' has been planned to satisfy the item acceptance but is in fact planned for less 'quantity' than accepted. To resolve this Problem, either reduce the item acceptance's 'quantity' (unlikely), or increase the Quantity planned by the item acceptance's 'delivery plan' to be within the accepted Quantity Range.

An "Acceptance Planned Excess" problem indicates that the 'delivery plan' has been planned to satisfy the item acceptance but is in fact planned for more 'quantity' than accepted. To resolve this Problem, either increase the item acceptance's 'quantity' (unlikely), or reduce the Quantity planned by the item acceptance's 'delivery plan' to be within the accepted Quantity Range.

A "Request Promised Late" problem indicates that the item promise has 'due' Dates that are later than the 'due' Dates of its item request. The Promise is for later than requested. To resolve this Problem, either the Request must be made for later (unlikely), or the Promise must be offered for earlier.

A "Request Promised Early" problem indicates that the 'delivery promise' has earlier 'due' Dates than its delivery request. The Promise is for earlier than requested. To resolve this Problem, either the Request must be made for earlier or the Promise for later.

A "Request Promised Short" problem indicates that the item promise has less 'quantity' than its item request. The Promise is for less than requested. To resolve this Problem, either the Request must be made for less or the Promise for made for more.

A "Request Promised Excess" problem indicates that the item promise has more 'quantity' than its item request. The Promise is for more than requested. To resolve this Problem, either the Request must be made for more or the Promise for made for less.

An "Item Promise Overpriced" problem indicates that the item promise has a higher 'price' than its item request's 'max price'. The promise is more expensive than requested. To resolve this Problem, either the Request must be made for more or the Promise for made for less.

A "Delivery Promise Overpriced" problem indicates that the delivery promise has a higher 'delivery price' than its delivery request's 'max price'. The promise is more expensive than requested. To resolve this Problem, either the Request must be made for more or the Promise for made for less.

A "Promise Not Offered" problem indicates that a Request has been issued, but the Promise has not been offered. More precisely, the promise's 'date offered' is before the request's 'date issued'. To resolve, either the Promise field 'date offered' must be set to 'date issued' or later.

A "Promise Not Confirmed" problem indicates that a Promise has been offered, but a Delivery Promise within it has not yet been 'confirmed'. This typically occurs when a Promise was offered based upon Available-to-Promise functionality rather than upon a plan to satisfy it. In that case, the planners will later need to create or replan a plan for that Promise and, once a plan has been created and approved, the planners will confirm those promises.

A "Promise Not Accepted" problem indicates that a Promise has been offered but not yet been accepted. More precisely, 'date accepted' is before 'date offered', which is at or after 'date issued'. To resolve, the field 'date accepted' must be set to 'date offered' or later.

An "Acceptance Inconsistent" problem indicates that a Promise has been 'accepted' but the acceptance date or quantity is different from what had been promised.

A "Request Queued" problem indicates that a Request has been answered unsatisfactorily, and then 'queued' by the requester for later reconsideration. More precisely, 'date queued' is at or after 'date offered', which is at or after 'date issued'. To resolve, 'date issued' or the Promise field 'date offered' must be set to at or after 'date queued'.

A "Delivery Request Not Coordinated" problem indicates that the items of a Delivery Request are not all scheduled for delivery on the same date.

A "Delivery Promise Not Coordinated" problem indicates that the items of a Delivery Promise are not all scheduled for delivery on the same date.

A "Delivery Acceptance Not Coordinated" problem indicates that the items of a Delivery Acceptance are not all scheduled for delivery on the same date.

As any change occurs to the data of a Request, Promise, Acceptance, Delivery Request, Delivery Promise, Delivery Acceptance, Item Request, Item Promise, or Item Acceptance, the invention reanalyzes the data and updates the identified problems. Data changes cause some problems to be eliminated and potentially others to be created. The human planner can see these updates in a character-based user interface or a graphical user interface. The automated planner would see these updates by notification of which problems are eliminated and which (if any) are created. For this purpose, the invention has a database of problems and an interface to an automated planner which communicates the stream of created and destroyed problems.

Changes can be made at any point in a negotiation, including after the negotiation is traditionally viewed as "complete" (Acceptance is made). After acceptance, the seller and buyer both have the ability to reopen negotiations. The seller is allowed to change the Promise to reopen negotiations. The buyer is allowed to change the Request to reopen negotiations. (The invention allows this, although some applications of the invention may not. In a manufacturing operation, machine breakages and strikes really require that promises be broken. Likewise, a supplier can rarely be rigid with their customers' requests.) When such changes occur, request-promise-acceptance problem calculations can be rerun. However, a locking mechanism can be used to prevent request and promise data from changing and instead reporting a warning if any entity attempts to change such data.

Although the present invention has been described in detail, it should be understood that various changes, substitutions and alterations can be made hereto without departing from the spirit and scope of the invention as defined by the appended claims.

What is claimed is:

1. A computer implemented system for negotiation and tracking of sale of goods, comprising:

a computer system having a processor and memory, the computer system executing a software application that provides a negotiation engine;

the negotiation engine operating to store data representing a current state of a negotiation between a seller and a buyer;

the negotiation engine storing the data within a framework for representing aspects of the negotiation between the seller and a buyer, the framework including:

a request object, a promise object and an acceptance object that can store a current description of a contract;

wherein the request object represents a request from a buyer that initiates negotiation, the promise object represents a promise to sell from seller in response to the request, and the acceptance object represents the buyer's acceptance of the promise;

wherein the current state of negotiations is determined by means of state transitions between the request object, promise object, and acceptance object, said state transitions having at least three tiers;

a set of one or more delivery deals determined by the contract, each delivery deal including a delivery request object, a delivery promise object, and a delivery acceptance object that can store associated item deals and time periods for delivery of item deals; and the item deals, each item deal including an item request object, an item promise object and an item acceptance object that can store individual sales-order line-items;

such that the negotiation engine allows a user to monitor the current state of the negotiation over a range of prices, a range of dates, ranges of quantities of a set of goods, and a range of configurations of the goods in the set.

2. The computer implemented system of claim 1, wherein the negotiation engine stores data representing the negotiation only at its current state.

3. The computer implemented system of claim 1, wherein the negotiation engine concurrently stores data representing the negotiation at request, promise and acceptance states.

4. The computer implemented system of claim 1, wherein the request object has a plurality of fields including delivery requests, delivery policy, accept by, date issued, date accepted, date queued, and changeable.

5. The computer implemented system of claim 1, wherein the promise object has a plurality of fields including delivery promises, delivery policy, accept by, date offered, and changeable.

6. The computer implemented system of claim 1, wherein the acceptance object includes a plurality of fields including delivery acceptances and accepted.

7. The computer implemented system of claim 1, wherein the delivery request object has a plurality of fields including item requests, due, max price, rate start, promising policy, fulfillment policy and rank.

8. The computer implemented system of claim 1, wherein the delivery promise object has a plurality of fields including item promises, due, delivery price, rate start and fulfillment policy.

9. The computer implemented system of claim 1, wherein the delivery acceptance object includes a plurality of fields including item acceptances, due, rate start and fulfillment policy.

10. The computer implemented system of claim 1, wherein the item request object has a plurality of fields including configuration, quantity, max price and delivery plan.

11. The computer implemented system of claim 1, wherein the item promise object has a plurality of fields including configuration, quantity, and price.

12. The computer implemented system of claim 1, wherein the item acceptance object includes a plurality of fields including configuration and quantity.

13. The computer implemented system of claim 1, wherein the negotiation engine further operates to identify problem conditions responsive to fields of the request object, promise object and acceptance object reaching certain thresholds in relation to one other.

14. The computer implemented system of claim 13, wherein the problem conditions pinpoint mistakes in the negotiation.

15. The computer implemented system of claim 13, wherein the negotiation engine further operates to provide resolution methods for each problem condition.

16. The computer implemented system of claim 13, wherein the problem conditions include a set of problems identified responsive to a change in data after an acceptance in an attempt to reopen the negotiation.

17. The computer implemented system of claim 1, wherein the negotiation engine further operates to export the data representing the current state of the negotiation to a planner-scheduler for purposes of prioritizing planning activities.

18. The computer implemented system of claim 17, wherein the exported data is used to report when the buyer and the seller made certain proposals and commitments.

19. The computer implemented system of claim 17, wherein the exported data is used for effective calculation of available to promise product.

20. A computer implemented process providing a framework for negotiation and tracking of sale of goods, comprising:

establishing a relationship between a plurality of negotiation states, the plurality of negotiation states including a no request state, a requested state, a promised state, a countered state, a queued state, and an accepted state;

identifying an action by a negotiating party as being an action selected from a group consisting of a request action, a promise action, a queue request action, a delete action and an acceptance action;

wherein the request action represents a request from a buyer that initiates negotiation, the promise action represents a promise to sell from seller in response to the request, and the acceptance action represents the buyer's acceptance of the promise;

moving between the plurality of negotiation states responsive to the action selected from the group; and storing data representing a current state of the negotiation; wherein the current state of negotiation is determined by means of state transitions between the request action, promise action, and acceptance action, said state transitions having at least three tiers.

* * * * *

(12) EX PARTE REEXAMINATION CERTIFICATE (7003rd)
United States Patent
Kennedy et al.

(10) Number: US 6,055,519 C1
(45) Certificate Issued: Aug. 18, 2009

(54) FRAMEWORK FOR NEGOTIATION AND TRACKING OF SALE OF GOODS

(75) Inventors: Brian M. Kennedy, Coppell, TX (US); Christopher D. Burchett, Carrollton, TX (US)

(73) Assignee: i2 Technologies US, Inc., Dallas, TX (US)

Reexamination Request:
No. 90/008,639, May 16, 2007

Reexamination Certificate for:
Patent No.: 6,055,519
Issued: Apr. 25, 2000
Appl. No.: 08/947,544
Filed: Oct. 11, 1997

(51) Int. Cl.
*G06Q 30/00* (2006.01)
*G06F 15/00* (2006.01)

(52) U.S. Cl. .................................................. 705/80
(58) Field of Classification Search .................. None
See application file for complete search history.

(56) References Cited

U.S. PATENT DOCUMENTS

| | | | |
|---|---|---|---|
| 3,573,747 A | 4/1971 | Adams et al. | |
| 4,799,156 A | 1/1989 | Shavit et al. | |
| 5,093,794 A | 3/1992 | Howie et al. | |
| 5,208,748 A | 5/1993 | Flores, II | |
| 5,253,165 A | 10/1993 | Leiseca et al. | |
| 5,361,199 A | 11/1994 | Shoquist et al. | |
| 5,504,837 A | 4/1996 | Griffeth et al. | |
| 5,508,913 A | 4/1996 | Yamamoto et al. | |
| 5,535,383 A | 7/1996 | Gower | |
| 5,615,269 A | 3/1997 | Micali | |
| 5,717,989 A | 2/1998 | Tozzoli et al. | |
| 5,734,837 A | 3/1998 | Flores et al. | |
| 5,794,207 A | 8/1998 | Walker et al. | |
| 5,884,041 A | 3/1999 | Hurwitz | |
| 5,893,074 A | 4/1999 | Hughes et al. | |
| 5,924,082 A | 7/1999 | Silverman et al. | |
| 5,949,876 A | 9/1999 | Ginter et al. | |
| 5,983,194 A | 11/1999 | Hogge et al. | |
| 6,055,519 A | 4/2000 | Kennedy et al. | |
| 6,167,380 A | 12/2000 | Kennedy | |
| 6,188,989 B1 | 2/2001 | Kennedy | |
| 7,133,835 B1 | 11/2006 | Fusz et al. | |

FOREIGN PATENT DOCUMENTS

| | | |
|---|---|---|
| EP | 370146 | 5/1990 |
| WO | WO9324892 | 12/1993 |
| WO | WO9704410 | 2/1997 |
| WO | WO9729443 | 8/1997 |

OTHER PUBLICATIONS

Lee et al.; Facilitating International Contracting: AI Extensions to EDI; Management Science and Information Systems, CBA 5.202; Jan. 1992; 32 pages.

(Continued)

*Primary Examiner*—Jeanne M Clark

(57) ABSTRACT

A computer implemented system and process are provided for negotiation and tracking of sale of goods. In this system and process, a negotiation engine (16) operates to store data representing a current state (18) of a negotiation between a seller and buyer. The negotiation engine (16) stores the data within a framework for representing aspects of the negotiation between the seller and buyer. The framework includes a request object, a promise object and an acceptance object that can store a current description of a contract. The framework also includes a set of one or more delivery deals determined by the contract. Each delivery deal can have a delivery request object, a delivery promise object, and a delivery acceptance object that can store associated item deals and time periods for delivery of item deals. Each item deal can have an item request object, an item promise object and an item acceptance object that can store individual sales-order line-items. The negotiation engine (16) thereby allows a user to monitor the current state of the negotiation over a range of prices, a range of dates, ranges of quantities of a set of goods, and a range of configurations of the goods in the set.

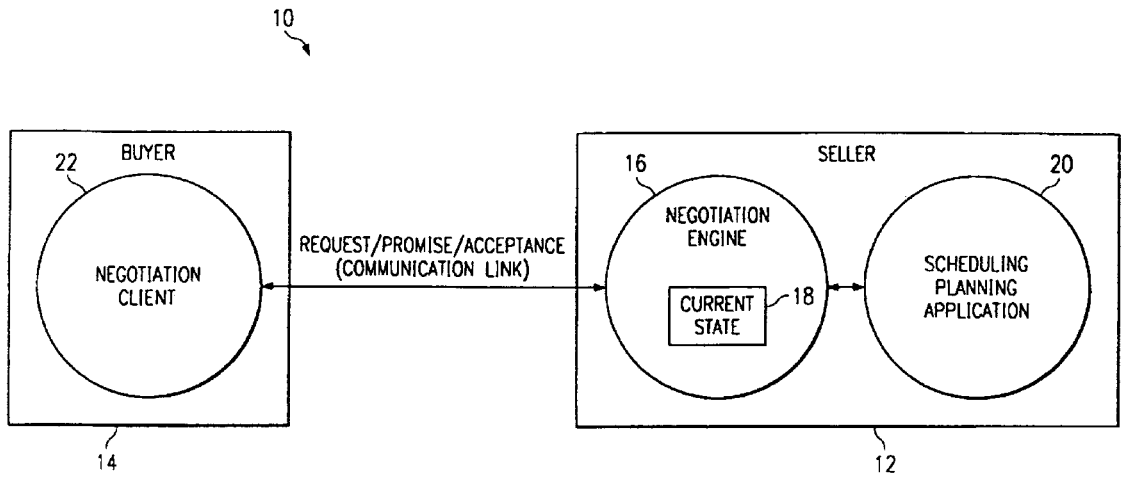

OTHER PUBLICATIONS

Sandholm et al.; Issues in Automated Negotiation and Electronic Commerce; Extending the Contract Net Framework; First Intl. Conf. on Multiagent Systems (ICMAS); 1995; 9 pages.

i2 Technologies, Inc., "Rhythm Intelligent Planning & Scheduling Systems—Interplant Manual", Jan. 19, 1995, USA.

i2 Technologies, Inc., "Rhythm Intelligent Planning & Scheduling Systems—User's Manual", Apr. 6, 1995, Version 2.7, USA.

i2 Technologies, Inc., "Rhythm Intelligent Planning & Scheduling Systems—Reference Manual", Apr. 6, 1995, Version 2.7, USA.

i2 Technologies, Inc., "Rhythm Intelligent Planning & Scheduling Systems—Tutorial Manual (Master Production Planner & Scheduler)" Feb. 24, 1994, Version 2.5, USA.

i2 Technologies, Inc., "Rhythm Intelligent Planning & Scheduling Systems—User's Manual (Master Production Planner & Scheduler)", Feb. 7, 1994, Version 2.5, USA.

i2 Technologies, Inc., "Rhythm Intelligent Planning & Scheduling Systems—Interplant Manual", Mar. 30, 1994, Version 2.5, USA.

i2 Technologies, Inc., "Rhythm Factory Planner User Manual", Oct. 2, 1997, Version 2.9, USA.

i2 Technologies, Inc., "Rhythm Intelligent Planning & Sceduling Systems—Rhythm Factory Planner User's Manual", Dec. 9, 1996, Version 2.9, USA.

i2 Technologies, Inc., "Rhythm Intelligent Planning & Sceduling Systems—Tutorial Manual", Jan. 31, 1996, Version 2.8, USA.

i2 Technologies, "Rhythm Intelligent Planning & Scheduling Systems—Tutorial Manual (Master Production Planner & Schedule)", Jan. 26, 1995, Version 2.7, USA.

i2 Technologies, Inc., "Rhythm Intelligent Planning & Scheduling Systems—User's Manual (Master Production Planner & Schedule)", Mar. 13, 1996, Version 2.8, USA.

i2 Technologies, Inc., "Rhythm Intelligent Planning & Scheduling Systems—Rhythm Factory Planner Reference Manual", Dec. 9, 1996, USA.

i2 Technologies, Inc., "Factory Planner Reference Manual—UNIX", Oct. 6, 1997, Verison 2.9, USA.

i2 Technologies, Inc., "Rhythm Factory Planner Transitional Manual—Moving from UNIX to Windows", Oct. 2, 1997, USA.

i2 Technologies, Inc., "Rhythm Factory Planner—Release Notes", Oct. 6, 1997, Version 2.9I, USA.

i2 Technologies, Inc., "Rhythm Factory Planner User Training Manual—Sections 1–8", May 2, 1997, Version 2.9, USA.

i2 Technologies, Inc., "PIMA Conference Materials & Notes—Orlando, Florida", Apr. 1997.

i2 Technologies, Inc., "Western Region Group Meeting—San Francisco", Apr. 1997.

AMIX Information Marketplace, American Information Exchange Customer Guide, Version 1.0, (1991), ("AMIX Customer Guide").

AMIX Software, Version 1.0, ("AMIX Software").

General Electric's Trade Process Network ("TPN"), see e.g., GE TPNPost, TPN Manager, User's Guide, (Jun. 1996), ("TPN Manager").

R/3 Release 2.1, System Enterprise Data Model, Feb. 1995 ("R/3 2.1, System Enterprise Data Model").

John Gessford, Object–Oriented System Design (1992), (Gessford, "Object–Oriented System Design").

Reid G. Smith, A Framework for Distributed Problem Solving, (1981), (Smith, "A Framework for Distributed Problem Solving").

Giovanni Adorni et al., MAP—A Language for the Modeling of Multi–Agent Systems, (Adorni et al., "MAP").

Jay M. Tenenbaum et al., eCo System: CommerceNet's Architectural Framework for Internet Commerce, CommerceNet Inc. White Paper (Jan. 17, 1997).

Anthony Chavez et al., Kasbah: An agent Marketplace for Buying and Selling Goods, MIT Media Lab (Apr. 1996), ("Chavez et al. (Kasbah)").

Reid G. Smith, The Contract Net Protocol: High–Level Communication and Control in a Distributed Problem Solver, IEEE Trans. on Computers, vol. C–29, No. 12, (Dec. 1980).

Gregory Kersten et al., Supporting International Negotiation with a WWW–Based System, International Institute for applied Systems Analysis (IIASA), IR–97–49 (Aug. 1997).

Robert Winter, A Database approach to Hierarchal Materials Planning, International Journal of Operations & Production Management, vol. 10, No. 2 (1990).(Winter, A Database Ap.

Tuomas Sandholm, An Implementation of the Contract Net Protocol Based on Marginal Cost Calculations, (1993). ("Sandholm II").

Susan E. Lander et al., Understanding the Role of Negotiation in Distributed Search Among Heterogeneous Agents, (1993). (Lander et al., Understanding the Role of Negotitation.

TIIES Buyer Workstation Reference Manual, (Aug. 28, 1992).("TIIES Buyer Workstation Reference Manual").

Theresa A. Moehlman et al., Decentralized Negotiation: An Approach to the Distributed Planning Problem, (1992). (Moehlman et al., ("Decentralized Negotiation").

Thomas Kreifelts et al., A Negotiation Framework For Autonomous Agents, (Aug. 1990).(Kreifelts et al., "A Negotiation Framework For Autonomous Agents").

Peter Clay, Advanced Available–to–Promise Concepts and Techniques, APICS Conference Proceedings (1990).(Clay, "Advanced Available–to–Promise Concepts and Techniques").

Edmund Durfee et al., Negotiating Task Decomposition and Allocation Using Partial Global Planning (1989). (Durfee et al., Negotiating Task Decomposition and Allocation Using.

Albert D. Baker, Manufacturing Control With A Market–Driven Contract Net, (May 1991), (Baker, "Manufacturing Control With A Market–Driven Contract Net").

Michael J. Shaw, FMS Scheduling As Cooperative Problem Solving, (1989). (Shaw II: "FMS Scheduling As Cooperative Problem Solving").

Michael J. Shaw, Dynamic Scheduling in Cellular Manufacturing Systems: A Framework for Networked Decision Making, (Shaw III: Dynamic Scheduling in Cellular Manufacturing Syst.

Michael J. Shaw et al., A Distributed Knowledge–Based Approach To Flexible Automation: The Contract Net Framework, (1988).(Shaw I: A Distributed Knowledge–Based Approach to F.

H. Van Dyke Parunak, Manufacturing Experience With The Contract Net, (1987), (Parunak I, Manufacturing Experience With The Contract Net).

H. Van Dyke Parunak et al., An Architecture for Heuristic Factory Control, (Mar. 1986),(Parunak III, "An Architecture for Heuristic Factory Control").
H. Van Dyke Parunak, The YAMS–Workstation Interface, (Jan. 1986), (Parunak II, "The YAMS–Workstation Interface").
Nicholas Jennings et al., Agent–Based Business Process Management, International Journal of Cooperative Information Systems, 5 (2&3), (Jennings et al., Agent–Based Business Pr.
SAP Sales and Distribution R23SD, Nov. 1996, ("R/3 R23SD Sales and Disribution").
SAP R/3 Materials Management, R23MM, Feb. 1997,("R/3 R23MM Materials Management").
SAP R/3 Sales LO605, May 1996,("R/3 LO605 Sales").
SAP Materials Management IR333,("R/3 IR333 Materials Management").
SAP Application Link Enabling (ALE) IR311,("R/3 IR311 ALE").
R/3 2.1 MM/SD Delta Course, Feb. 1994,("R/3 MM/SD Delta Course").
SAP R/3 WF The EDI Interface–Basis, Dec. 1993,("R/3 WF The EDI Interface–Basis").
R/3 System PP Master Planning/Material Requirements Planning Guide, Sep. 1994,("R/3 PP MP/MPR Guide").
R/3 System MM—Purchasing Guide, Mar. 1994,("R/3 MM Purchasing Guide (1994)").
R/3 System MM Introduction to Materials Management, Mar. 1993,("R/3 MM Introduction to Materials Management").
R/3 System MM—Purchasing Guide, Jul. 1993, ("R/3 MM Purchasing Guide (1993)").
R/3 3.0 Triggering, Mar. 1996, ("R/3 3.0 Triggering").
R/3 3.0c Certification of the EDI Interface, Mar. 1996, ("R/3 3.0c Certification of the EDI Interface").
R/3 3.0 Adjusting Processes for Workflow, Feb. 5, 1997, ("R/3 3.0 Adjusting Processes for Workflow").
R/3 3.0/3.1 How to Define an IDoc Type, Nov. 21, 1996, ("R/3 3.0 How to Define an IDoc Type").
The IDoc Interface, May 1996, ("The IDoc Interface Presentation").
SAP EDI Interface in R/3, May 1995,("SAP EDI Interface in R/3").
IDOCs as a Means for Data Exchange via EDI and with ALE, May 15, 1996, ("IDocs as a Means for Data Exchange via EDI and with ALE").
Integrating the Supply Chain, Coping with CRP Critical Mass, 1995, ("Integrating the Supply Chain: Coping with CRP Critical Mass").
SAP ALE—From Concept to Product, Aug. 1995, ("ALE From Concept to Product").
R/3 EDI Documentation Intermediate Document Type ORDERS01, Aug. 24, 1995, ("R/3 EDI Document Types ORDERS01").
R/3 Documentation of IDoc Types (Overview) ORDERSOV, Feb. 12, 1996, ("R/3 EDI Idoc Types ORDERSOV").
WF–EDI: Documentation record types, RECORDC, Apr. 15, 1996,("R/3 EDI Record Types RECORDC").
R/3 EDI Documentation Record Types, Records, Apr. 15, 1996, ("R/3 EDI Record Types Records").
R/3 EDI Documentation Record Types, Records, Apr. 15, 1996, ("R/3 EDI Record Types Records").
R/3 EDI ORDERS01 Segment Structure,("R/3 EDI ORDERS01 Segment").
R/3 EDI Control Fields, STRUREC, ("R/3 EDI STRUEC").
R/3 3.0c Certification of the EDI Interface, Mar. 1996, ("R/3 3.0c Certification of the EDI Interface").
SAP info, Apr. 1994,("SAP info, Apr. 1994").
http://web.archive.org/web/19980507130907/http://tpn.geis.com.
http://web.archive.org/web/19980209064809/tpn.geis.com/tpn/resource_center/press.html.
http://web.archive,org/web/19980209070440/tpn.geis.com/tpn/resource_center/062496.htm.
Carrie Beam, Arie Segav and J. George Shanthikumar, "Electronic Negotiation Through Internet–Based Auctions", Dec. 1996 (found at http://haas.berkeley.edu/~cltm/wp–1019–summary.html).

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 20 are determined to be patentable as amended.

Claims 2–19, dependent on an amended claim, are determined to be patentable.

New claims 21–33 are added and determined to be patentable.

1. A computer implemented system for negotiation and tracking of sale of goods, comprising:
   a computer system having a processor and memory, the computer system executing a software application that provides a negotiation engine;
   the negotiation engine operating to store data representing a current state of a negotiation between a seller and a buyer;
   the negotiation engine storing the data within a framework for representing aspects of the negotiation between the seller and a buyer, the framework including:
      a request object, a promise object [and], an acceptance object, *and a queue object* that can store a current description of a contract;
      wherein the request object represents a request from a buyer that initiates negotiation, the promise object represents a promise to sell from seller in response to the request, [and] the acceptance object represents the buyer's acceptance of the promise, *and the queue object includes a time period during which the buyer determines whether to accept the promise, delete or withdraw the request, issue a new request, or re-queue the request, and during which the seller determines whether to promise to sell in accordance with the request or offer a new promise*;
      wherein the current state of negotiations is determined by means of state transitions [between] *among* the request object, promise object, [and] acceptance object, *and the queue object*, said state transitions having at least three tiers;
   a set of one or more delivery deals determined by the contract, each delivery deal including a delivery request object, a delivery promise object, and a delivery acceptance object that can store associated item deals and time periods for delivery of item deals; and
   the item deals, each item deal including an item request object, an item promise object and an item acceptance object that can store individual sales-order line-items;
   such that the negotiation engine allows a user to monitor the current state of the negotiation over a range of prices, a range of dates, ranges of quantities of a set of goods, and a range of configurations of the goods in the set.

20. A computer implemented process providing a framework for negotiation and tracking of sale of goods, comprising:
   establishing a relationship between a plurality of negotiation states, the plurality of negotiation states including a no request state, a requested state, a promised state, a countered state, a queued state, and an accepted state;
   identifying an action by a negotiating party as being an action selected from a [group consisting of] *plurality of actions, the plurality of actions consisting of* a request action, a promise action, a queue request action, a delete action and an acceptance action;
   wherein the request action represents a request from a buyer that initiates negotiation, the promise action represents a promise to sell from seller in response to the request, and the acceptance action represents the buyer's acceptance of the promise;
   moving [between] *among* the plurality of negotiation states responsive to the action selected from the group; and
   storing data representing a current state of the negotiation; wherein the current state of negotiation is determined by means of state transitions between the request action, promise action, and acceptance action, said state transitions having at least three tiers.

*21. The process of claim 20, wherein the queue request action represents a time period during which the buyer determines whether to accept the promise, delete or withdraw the request, issue a new request, or re-queue the request, and during which the seller determines whether to promise to sell in accordance with the request or offer a new promise.*

*22. The process of claim 20, wherein the current state of negotiation is determined by means of state transitions between the request action, promise action, acceptance action, and queue request action.*

*23. The process of claim 20, further comprising storing data representing a date of each state transition along with the state transition.*

*24. The process of claim 20, further comprising identifying potential request and promise problems based on the state transitions.*

*25. The process of claim 20, further comprising identifying potential request and promise problems based on the state transitions and the dates associated therewith.*

*26. The process of claim 25, further comprising:*
   *maintaining a database of identified problems; and*
   *displaying the identified problems according to a comparison of date ranges.*

*27. A computer implemented system for negotiation and tracking of sale of goods, comprising:*
   *a computer system having a processor and memory, the computer system executing a software application that provides a negotiation engine;*
   *the negotiation engine operating to:*
      *establish a relationship between a plurality of negotiation states, the plurality of negotiation states including a no request state, a requested state, a promised state, a countered state, a queued state, and an accepted state;*
      *identify an action by a negotiating party as being an action selected from a group consisting of a request action, a promise action, a queue request action, a delete action and an acceptance action;*
      *wherein the request action represents a request from a buyer that initiates negotiation, the promise action* represents a promise to sell from seller in response to the request, and the acceptance action represents the buyer's acceptance of the promise;

move among the plurality of negotiation states responsive to the identified action; and store data representing a current state of the negotiation; wherein the current state of negotiation is determined by means of state transitions between the request action, promise action, and acceptance action, said state transitions having at least three tiers.

28. The computer implemented system of claim 27, wherein the queue request action is a time period during which the buyer determines whether to accept the promise, delete or withdraw the request, issue a new request, or re-queue the request, and during which the seller determines whether to promise to sell in accordance with the request or offer a new promise.

29. The computer implemented system of claim 27, wherein the current state of negotiation is determined by means of state transitions between the request action, promise action, acceptance action, and queue request action.

30. The computer implemented system of claim 27, wherein the negotiation engine stores data representing a date of each state transition along with the state transition.

31. The computer implemented system of claim 27, wherein the negotiation engine identifies potential request and promise problems based on the state transitions.

32. The computer implemented system of claim 27, wherein the negotiation engine identifies potential request and promise problems based on the state transitions and the dates associated therewith.

33. The computer implemented system of claim 28, wherein the negotiation engine maintains a database of identified problems and displays the identified problems according to a comparison of date ranges.

* * * * *